United States Patent

Ralston et al.

[15] 3,660,168
[45] May 2, 1972

[54] LEAK-PROOF PRIMARY CELL

[72] Inventors: Robert E. Ralston, Spring Valley; Yung Ling Ko, Peekskill, both of N.Y.

[73] Assignee: P. R. Mallory & Co. Inc., Indianapolis, Ind.

[22] Filed: Apr. 9, 1970

[21] Appl. No.: 26,911

[52] U.S. Cl. ............................................. 136/107, 136/169
[51] Int. Cl. ....................................................... H01m 21/00
[58] Field of Search .................................. 136/107, 131–135, 136/83, 100, 175, 169, 79–81

[56] References Cited

UNITED STATES PATENTS

| | | | |
|---|---|---|---|
| 3,056,849 | 10/1962 | Warren et al. | 136/83 |
| 2,766,316 | 10/1956 | Stevens, Jr. et al. | 136/133 |
| 3,016,414 | 1/1962 | Priebe | 136/107 |
| 2,771,381 | 11/1956 | Morehouse | 136/107 X |
| 3,069,485 | 12/1962 | Winger et al. | 136/6 |
| 2,802,042 | 8/1957 | Anthony et al. | 136/133 |
| 3,096,217 | 7/1963 | Clune | 136/107 |
| 2,993,947 | 7/1961 | Leger | 136/107 |
| 3,116,172 | 12/1963 | Wilke et al. | 136/107 |
| 3,510,358 | 5/1970 | Nabiullin et al. | 136/107 |
| 2,816,152 | 12/1957 | Marsal | 136/106 |

*Primary Examiner*—Anthony Skapars
*Attorney*—Robert Levine

[57] ABSTRACT

A leak-proof electrochemical cell having a cylindrical can closed on its bottom end, and open at its top end, with an internal peripheral bead as a seat for a plastic disc to be seated on the bead to cover the elements within the cell, and to receive the crimped end of the can for closure, and constructed to have a central co-axial bore and co-axial hub around the bore to hold a rivet to support an anode collector from the bottom side of the plastic disc and to support one of the terminals of the cell, here specifically the negative cap or terminal, from the top of the rivet, and to perform the additional function of closing the usual separator, with no intervening structure between it and the separator, to assure greater confining control of he electrolyte by said separator. The plastic disc top also constructed unitarily of full can diameter, and has an annular border disposed to provide a tight seating fit in the can at the bead as a seat, and is held in place by crimped edge rim of the can to assure a substantially hermetic seal between the disc border and the can. An external metal jacket surrounds and is insulated from the can, and serves as an additional element for impressing an additional pressure force on the metal crimped onto the plastic disc, to assure a hermetic seal under continuous pressure between those engaging surfaces of said disc border and of the crimped metal.

The anode collector is constructed of two hollow semi-cylindrical parts held to resist radial relative displacement, and to thereby maintain uniform ionic spacing between cathode and anode collector facing surfaces.

18 Claims, 5 Drawing Figures

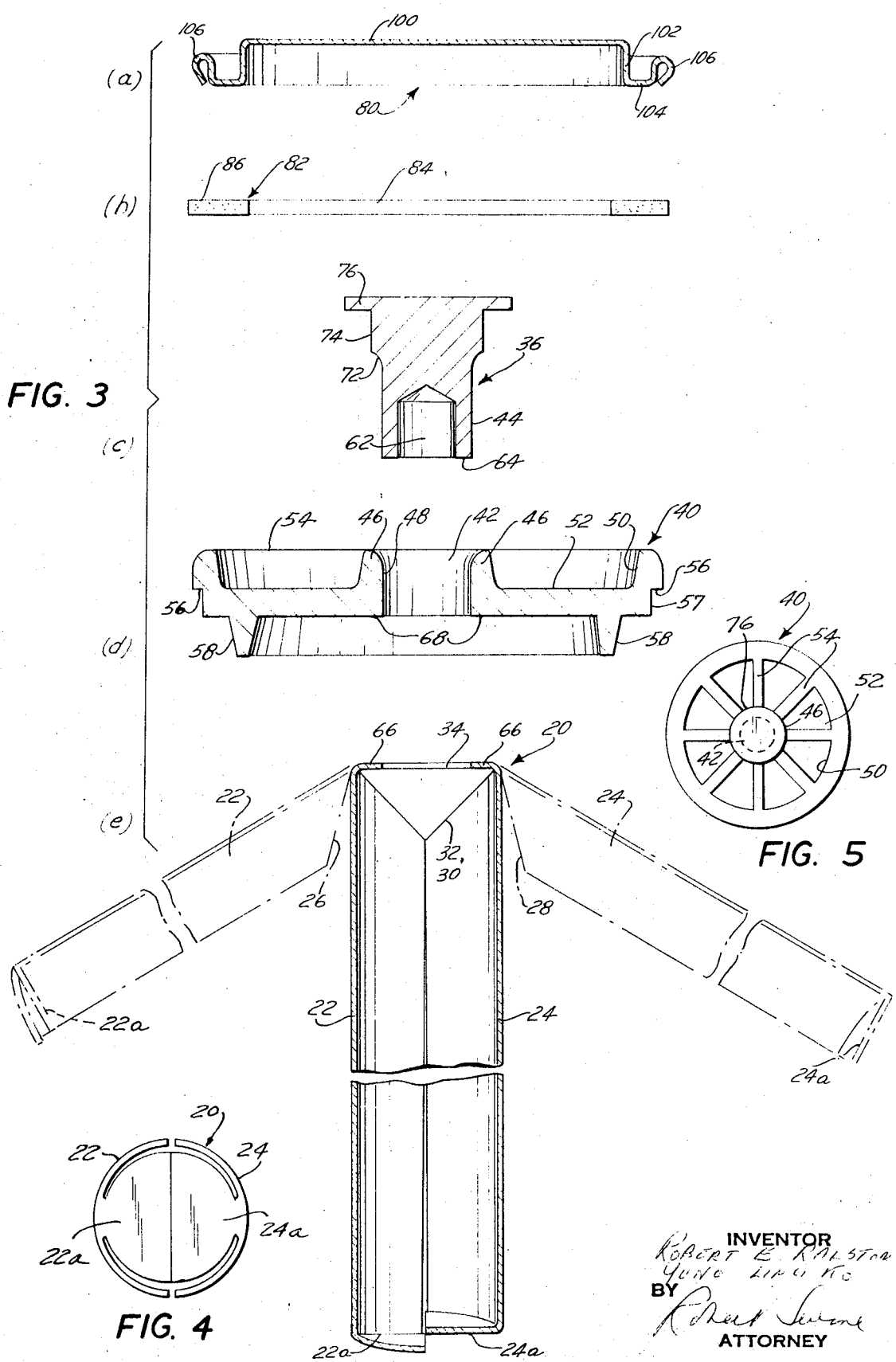

LEAK-PROOF PRIMARY CELL

DESCRIPTION OF THE INVENTION

This invention relates to electrochemical cells, and, more particularly, to an alkaline dry cell of improved design construction, to provide a greater assurance of stability in operating characteristics, and particularly to provide a construction for preventing leakage of the electrolyte to the outside of the cell.

In the evolution and development of alkaline dry cells, the greatly improved type of operation obtained from that type of cell has led to its use in many fields of application where primary electro-chemical cells have generally not been available for such use.

In many cases the optimum usage of such improved cells in those new applications nevertheless required some changes in the structural design, in view of greatly changed dimensions relative to prior cells, so that as a result the problem of satisfactorily sealing a cell to prevent electrolyte creepage was always a recurring problem with each new design and dimensional change.

At the same time, of course, since such primary batteries have been essentially throwaway units which become used up during their normal operation and are then thrown away when the chemical components therein have essentially been completely converted to non-useable or non-active condition within the cell, the usual economic goal of low-cost production has always been one of the pressing and desirable factors in the evolutionary development of cells of this type.

In all cases, with any change in previous structural design or previous dimensions, in order to fit into a new environment and application, there intruded the ever-pressing problem of assuring that such new design and such new dimensions would not result in conditions that would promote or permit leakage or creepage of the electrolyte to undesired regions of the cell.

Thus, the problem of leakage and creepage prevention has been always present, irrespective of any other improvements that may have been made during the progressive development of those cells.

The present invention is directed to certain novel features of redesign in a cell, in which particularly new structural design features leading to better sealing of the cell have been achieved, while providing for low-cost production.

As a result of such assured hermetic sealing of the cell, long shelf life is assured without any leakage of the electrolyte out through the cell ends that would lead to the formation of encrustations, that would not only disfigure the appearance of the cell but would raise doubts as to whether the cell was still in operative condition.

In accordance with this invention, in a general form of construction of a cell embodying the features provided by this invention, the usual cathodic and anodic chemical elements with a suitable separator are disposed in a cathodic metal can or cup, closed at the bottom, and initially fully open at the top, to permit unimpeded and direct insertion of those chemical elements and the separator into said can. The can is then appropriately reformed and shaped to provide an internal peripheral bead disposed slightly below the top edge of the open end of the can, such bead being provided to serve as a seat for a plastic plate or disc which is then inserted axially into the can to seat and rest on the bead and to receive the can crimp. A radially recessed annular shoulder is provided in the side of the plastic disc to seat on the bead. The plastic disc serves also as a support for an anode collector which is inserted into the cell by manipulation of the plastic top to its rest position. After that insertion of disc and anode collector into the can, the open end edge of the can is crimped over the top outer surface of the plastic disc above the shoulder which rests on the bead.

The plastic disc serves also to press on the top of the separator between anode and cathode which here is in the form of an open bag, and said disc serves to fold the top of the bag to enclose the electrolyte gel usually employed in this cell.

The plastic disc is thus a novel unitary insulating element in such cells, to support an anode collector, to shape the separator bag to closed or substantially closed condition, to receive the closing and sealing crimp of the open can end, and to co-axially support a rivet to support said anode collector from below and to support an external terminal plate, at the end of the cell, that is ultimately welded to the rivet head after the cell is filled and closed and crimped.

One of the objects of this invention is to provide a unitary plastic cell top or disc with a resilient vertical edge portion in a position to receive the crimp from the container can for better seal characteristics at such crimp.

Another object of this invention is to provide said unitary plastic cell top or disc with a central bore to receive a rivet, for supporting an anode collector from under said disc, and for supporting an outer negative terminal plate of the cell; the rivet having a tapered body or shank to minimize assembly problems and to obtain optimum fit between the rivet and said disc in said bore.

Another object of this invention is to provide said unitary plastic disc with a raised hub concentric with said bore to have a long surface contact with said rivet, to minimize electrolyte creepage along the rivet.

The plastic disc, in order to fully utilize the desirable features of this invention, should have a slight resiliency, free of cold flow, with a memory that will tend to restore the plastic disc to its initial or original position after it has been slightly deformed by pressure. In the present case, where the outer rim edge of the can is crimped over the outer and upper surface of the plastic top, such crimping is intentionally slightly over-pressed, but within the elastic limit of the metal, so that the crimped metal will have a slight tendency to move backward towards its original position, upon release of the crimping force, and thereby slightly relieve the pressure on the compressed and deformed plastic disc surface. Due to its resilience, the plastic disc material will also tend to move toward its original position and will follow the crimped metal of the can through the slight return movement of that crimped metal, to thereby maintain the tight reaction pressure between the crimped metal of the cathode can and the engaged surface of the plastic disc.

Since the plastic disc is supported on the bead of the can by the shoulder or inward step around the periphery of the plastic top, and, at the same time, is also held by the crimped material of the cathodic metal cup or can, the bead and the crimped material act essentially as the two jaws of a pincer to hold the plastic top in a tight grip. This assures better seal.

This pincer feature in itself is sufficient to assure good sealing between those two surfaces that are held under pressure against each other, but the invention includes an additional feature which impresses an additional pressure force on the crimped material to essentially lock the clamping and pincer action on the plastic disc, for complete and final assurance that the pincer grip on that plastic disc will be retained for the life of the cell, and leakage of electrolyte completely prevented from working along those engaging surfaces.

Thus, another object of this invention is to provide a novel and improved crimp at the end of a cell can, which places an additional external pressure on the sealing crimp on the plastic disc, to maintain said pincer effect by holding the original crimp against its natural resiliency and consequent tendency to 'spring back'.

To achieve such additional compression or pressure force on the crimped end section of the can, a metal jacket is disposed around the steel cathode can and is suitably insulated therefrom, as, for example, by an intermediate paper tube. The metal jacket, open at both ends originally, is then suitably itself crimped at both ends together with the paper insulating tube, and is essentially placed in tension to press a negative metal cap as an electrode terminal at one end of the cell, and to press a positive metal cap at the other end of the cathode can of the cell, to permit simple connection of the final electrochemical cell as an element in an external circuit.

As previously indicated, the needs of the electrochemical batteries are such, that a primary object of the invention is to provide a simple and economic construction in which a hermetic seal is assured, so that no leakage of electrolyte will occur from the internal structure of the cell and move to the outside of the cell closure, and, also, so that no internal creepage of electrolyte will occur between two regions that should be kept separated.

The anode collector is electrically connected through the rivet to the outer negative metal cap. The metal cap is welded to the head of the rivet. The rivet is preferably made of an alloy commercially designated "nickel silver," although devoid of silver, to be compatible with the anode material and to provide good resistance welding characteristics. Alloys of 8 to 18 percent nickel have been found satisfactory.

Another object of this invention is to provide said unitary plastic disc having a relatively long bore surface engaged by said rivet to minimize electrolyte creepage along the rivet surface to protect a weld employed between the flat head top surface of said rivet and an outer negative terminal plate.

Another object of this invention is to provide said unitary plastic disc having also a depending circular apron for acting upon and closing a separator structure to confine the electrolyte therein to minimize creepage of the electrolyte from its intended place within the container.

Another object of this invention is to provide said disc and separator relation with no intervening member between the plastic disc structure and said separator.

Another object of this invention is to provide a structural feature on the anode collector to hold the collector in cylindrical shape and to prevent collapse due to gel pressure.

Another object of the invention is to provide a sealing structure for the cell in which a simple and economical mechanical assembly of the anode structure of the cell is provided, which will permit simple and ready manipulation, either manually or by automatic means for assembling the anode structure into and in the cell in a proper desired position for final assembly and closure of the cell as a finished manufactured article.

The details of construction of a cell in accordance with the present invention, and other features of it, are more fully explained in the following description, taken together with the accompanying drawings, in which:

FIG. 3 is an exploded view of the elements that enter into the structure and assembly of the anode collector and supporting plastic disc when assembled and disposed as shown in position in FIG. 2;

FIG. 4 is a schematic view of bottom lugs on the anode collector element of FIG. 3 (e), which are slightly twisted to be slightly transverse to each other, to hold the two semi-cylindrical side arms in symmetrical cylindrical position to prevent compression and closure of the anode collector as a cylinder, beyond the desired operative position as shown in FIG. 2;

And FIG. 5 is plan view of the disc to show radial re-inforcing ribs formed on the upper part thereof.

Figure 1:
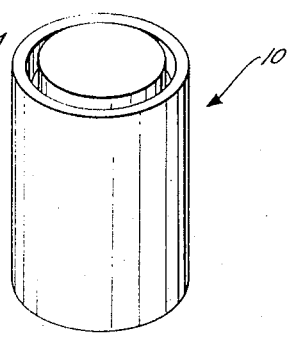
FIG. 1 is a schematic external perspective view of a typical cell body, embodying this invention.

As shown in FIG. 1, a cell 10 constructed in accordance with the present invention is shown in perspective, merely to illustrate its external appearance.

Figure 2:
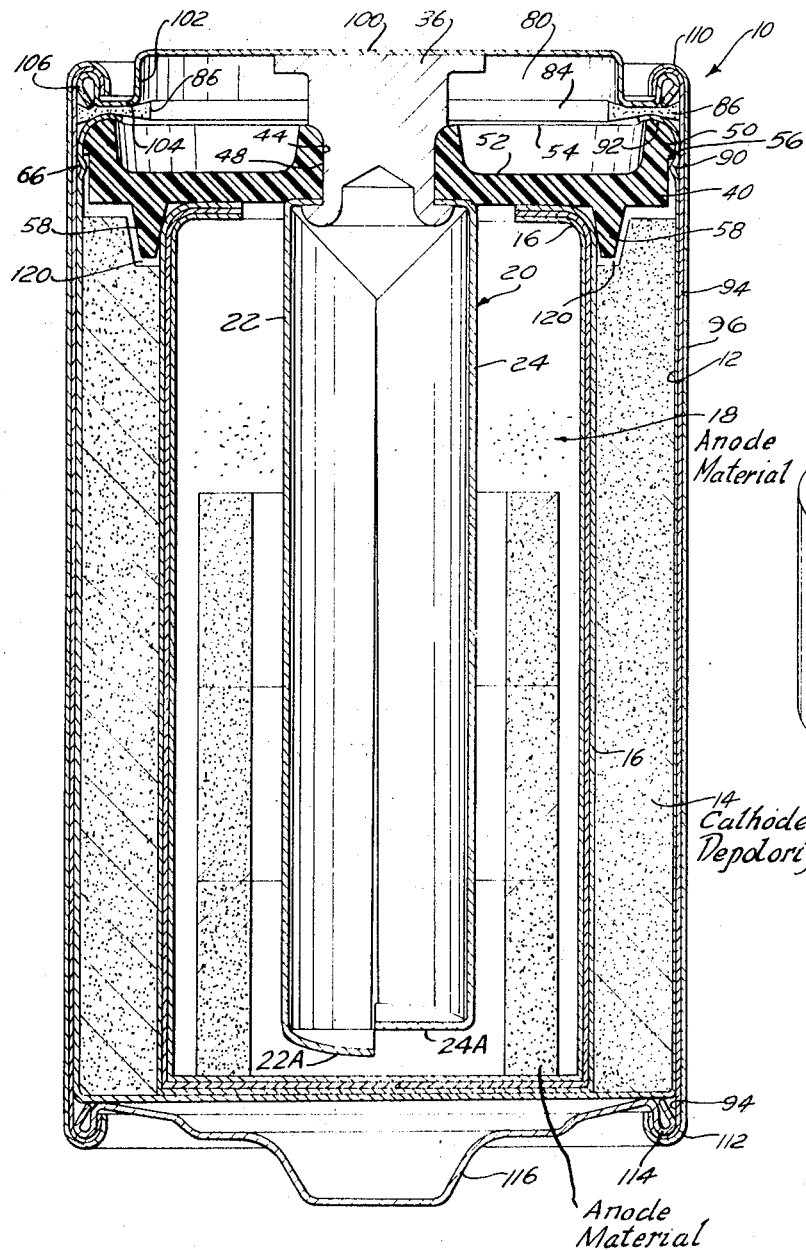
FIG. 2 is a vertical mid-section through the cell of FIG. 1 taken along the line 2—2 in FIG. 1, and shows the various elements of the cell and their general arrangement within the shell enclosure, and relative, to each other.

As shown in FIG. 2, a cathode can 12, which may be of steel, and is closed at the bottom and originally open entirely at the top, serves as the main container for the elements of the cell. An annular cylinder 14 of cathodic material, to serve as a depolarizer, and consisting essentially of $MnO_2$ mixed with graphite or carbon particles, is of proper size and shape to fit snugly upon direct axial insertion into the steel cathode can 12. A separator 16 is disposed as a lining in the cathode material 14, and is shown here, for simplicity and merely by way of example, as consisting of three concentrically fitted elements of a suitable electrically insulating porous material, and for the present purpose are shown as fitted paper bags 16 closed at the bottom and open at the top. The space within the inner paper bag 16 may then be filled with suitable anodic material, which may be here simply described, for example, as zinc powder in pellet form, which may be easily displaced upon insertion of the anode element about to be described.

The electrolyte of the battery, consisting of a jelly-like mixture of KOH and ZnO, is then poured into the central space, in the inner bag 16, between the zinc pellets, and the cell is now ready to receive its anode collector 20, which is supported on the closure assembly consisting generally of the elements shown in FIG. 3.

To simplify the explanation relating to the construction and assembly of the closure element, which also serves to support the anode collector 20, all of those elements will be described with reference first to FIG. 3, and then their assembled disposition will be considered in the final construction as shown in FIG. 2.

As shown in FIG. 3, the anode collector 20 at the bottom of the figure consists of two elongated side elements 22 and 24, that are concavely semi-circular in shape, so as to constitute a relatively symmetrical cylinder in closed form, when those two elongated side elements are pressed downward together as shown in solid line in FIG. 3 (e), from the dotted-line outwardly extending positions shown in that same Figure. The two upper ends of those two arms 22 and 24 are mitered along the arcs indicated by the dot-dash lines 26 and 28, so those mitered edges will engage co-fitting edges of two mitered triangular wings 30, 32, extending respectively forward and rearward transversely to the two side arms 22 and 24.

The anode collector 20 has a front and a rear wing 30 and 32, although only the rear wing 32 is visible in FIG. 3 (e). In order for the anode collector 20 to be mounted and supported, as will be explained, the collector 20 is also provided with a hole 34 which is designed to receive an anchoring rivet 36, shown above in FIG. 3 (c), in order to rivet and support the anode collector 20 on a main plastic disc 40 of FIG. 3 (d), which functions to provide several of the novel features of this invention, previously referred to.

The plastic disc 40 in FIG. 3 (d) is circular in shape to fit the can 12, and has a central axial bore 42 of appropriate dimension to receive the slightly tapered body shank 44 of the rivet 36, with a tight press fit. The central bore 42 of the disc 40 is surrounded by a boss or hub 46 with an internal bearing surface 48 that is relatively long, in order to provide a long sealing path between that central bore surface 48 and the body shank 44 of the rivet 36 in the assembly. Also, the relative dimensions of the bore diameter and the shank diameter provide for the tight press fit.

The plastic disc 40 also has a circular peripheral border rim 50 which rises above the annular body floor plate 52, which makes the plastic disc a relatively rigid structure. In addition, in order to provide for additional reinforcement between the central hub 46 and the peripheral border rim 50, there are several radial ribs 54 distributed in a wheel-spoke fashion between the hub 46 and the peripheral border rim 50.

The border rim 50 of the plastic disc 40 is externally provided with a radially-inward shoulder 56, that is to serve, in part, as the seating surface of the plastic disc 40 when assembled in the final assembly of the cell.

The plastic disc 40 is further provided with a depending circular and concentric annular apron 58, near the rim of the disc, whose purpose and function will be described in connection with the assembly of FIG. 2.

The next element in FIG. 3 to be described is the rivet 36, in FIG. 3 (c), which is shown with the body shank 44 already referred to and with a central recess 62 which leaves the shank 44 in the form of an extended cylinder with a relatively thin wall which can be peened over at its lower edge 64 to fit under the border rim 66 on anode collector 20 encircling the hole 34 in the anode collector 20 in FIG. 3 (e), to fixedly secure that anode collector 20 to the bottom surface 68 of said supporting plastic disc of FIG. 3 (d).

Referring back to the rivet 36, of FIG. 3 (c), it will be seen that the body shank 44 rises to a curve at region 72 to fit and seat snugly on the top edge of said central hub 46 of said plastic disc, in order to provide assurance of additional tight sealing action between these two surfaces in assembly. In addition, shank 44 is tapered increasingly upwardly to assure a tight pressure fit in bore 42 of plastic disc 40. The body shank 44 of rivet 36 then rises above the curved portion 72 to a thicker main shank body 74 on which rests a flat head 76 of the rivet 36. That flat head 76 will later serve as a supporting surface to receive a negative cap terminal 80 of the cell spot-welded thereto in final assembly. The negative cap 80 is shown in FIG. 3 (a). One of the features in this application may be referred to at this point. In the assembly of the cell it will be necessary to weld said negative cap 80 to the top head surface 76 of said rivet 36, and that operation will be performed by resistance welding, in which the two electrodes of the welding circuit are placed on the top surface of the negative cap 80 in an area directly above the area encompassed by the head surface 76 of said rivet 36. Thus the negative head cap 80 will be spot-welded to the rivet at two points, or more if so desired, with an assurance of a complete low-resistance circuit connection between said negative end cap 80, as an external terminal for the cell and said rivet 36, which in turn will have been mechanically and rigidly and electrically connected as a low resistance connection to the anode collector 20.

Also shown in FIG. 3, although not at this time essential to the description of the assembly of the negative end cap 80 to the anode collector 20, is an annular washer 82, of insulating material, for example, paper, having a relatively large bore 84 of such dimension that the annular border body 86 of said annular washer 82 will be co-extensive with and will bridge the circular annular border rim 50 of said plastic top 40 shown in FIG. 3 (d). In the final assembly, said washer 82 will be seated on the crimp of the end of tube 12 to provide an insulating seat for said outer negative end cap terminal 80, as in FIG. 2.

Attention is directed for a moment to FIG. 4, which shows the lower ends of this half-cylinders 22 and 24 of the anode collector 20. A tab is formed at the lower end of each of the two semi-cylindrical arms 22 and 24, and those two tabs, indicated as 22-a and 24-a, are bent radially inward towards the axis of the final anode cylinder collector 20, but in addition, those two tabs 22-a and 24-a are twisted relative to each other, to be non-co-planar and to transversely face each other edgewise, so the two lower ends of anode collector 20 will be held in proper cylindrical spacing and will prevent the two sides of collector 20 from being pressed closer together than the cylindrical form desired, thereby ensuring that the anode collector 20 will remain a cylinder concentric throughout its entire length within the electric cell, and thereby assuring that the distances between the anode collector surface and the inner surface of the cathode material are all held substantially equal, so there will be a relatively uniform distribution of ionic current between those two surfaces.

By so constructing and maintaining the outer surface of the anode collector cylindrically co-concentric within the chemically active material between the anode collector and the cathodic material, the development of concentration paths between those two surfaces is eliminated, thereby preventing any concentration of ionic current along a preferred voltage path, to the detriment of the proper operation of the cell. This is one of the advantageous features of this invention, since it contributes to the assurance of uniform operation of the cell over its entire length, and prevents short-circuiting and reduced operating life. Referring now back to FIG. 2, it may be explained that after the insertion of the cathodic material 14 within the original cathode tube 12, a bead 90 is formed peripherally around the inner surface of the tube to extend inwardly, and to serve as a circular seat for said plastic disc 40 at the undercut shoulder 56 formed on the periphery of that plastic top 40, as explained in FIG. 3 (d).

After the inner bead 90 is formed in the cathode tube 12, the open end rim of the tube is still in its original open condition, thereby permitting the assembly of the rivet 36 and the plastic disc 40 and the anode collector 20, from FIG. 3, to be inserted into that open inner steel tube 12 and pressed inwardly until the plastic disc 40 is seated upon said bead 90.

In order to obtain the desired good sealing conditions within the cell, the dimensions of the plastic disc 40 should be such as to require a relatively pressed fit into the cathode steel tube 12, so that the seating corner edge at the edge of the shoulder 56 will fit snugly within the tube 12, and will position the entire assembled unit relatively concentrically with the final cell. The surface 57 depending directly down from the stepped shoulder 56 on the plastic disc 40 may also be dimensioned to fit relatively snugly against and within the bead 90.

As previously explained, after the cathodic depolarizer material 14 is inserted and the separator 16 is placed in position, and the electrolyte is disposed within the separator space, the cell is ready to receive the anode collector 20.

Another advantageous feature of this invention will now be appreciated. Since, in many cases, the cells are relatively small, the component parts are correspondingly small and require careful and fine handling. This is particularly so in the operation of positioning the anode collector. Here, the anode collector is more readily manipulatable since it is secured to and supported on the plastic disc 40, which now also serves as a handle for manipulating the anode collector 20, and thus also provides this desirable function as a handle for manual or automatic operations.

When the plastic disc and the anode collector assembly are inserted coaxially into can 12, the anode collector 30 can be forced down into the jelly-like electrolyte with relatively light pressure, even though the electrolyte will have in the meantime absorbed the zinc powder pellets within the separator paper bags 16 that serve as barriers between the electrolyte and anodic material within the bags, and the cathodic material outside of the bags.

After the plastic disc 40 is seated, the first crimping operation is performed to crimp over the open edge end of the open can 12 onto the top surface of the border rim 50 of the plastic disc 40.

This part of the operation of sealing the cell also embodies an important feature of the invention in this construction. The material which has been found particularly suitable for the use desired here in the plastic top 40 is nylon. It has the characteristics previously described as desirable, in that it will accept a certain amount of compression and has a memory characteristic which tends to restore it to its original condition. The metal crimping material at the outer end of the metal cathode 12 is overpressed during assembly so that it will press the nylon material more than is necessary for a good seal, but since such pressure of the metal is within the elastic limit of the metal, the crimped portions tend to return slightly towards their original condition, and thus tend to relieve some of the pressure on the nylon material. As a result, the nylon material follows the relieving movement of the crimped material and maintains a high pressure surface-to-surface relationship between the nylon material and the crimped metal of the can 12, thereby maintaining the desired high pressure seal between those two surfaces that prevents creepage of any electrolyte material that might be moved into that area as the cell is externally and manually manipulated for any reason.

In order to maintain that high pressure surface-to-surface relationship between the plastic cap material and the crimping metal of the can, an additionally extremely important feature is provided here. Annular washer 82, of insulating material, such as hard paper, for example, previously referred to in FIG. 3 (b), now comes into service, and seats on top of the crimped material 92 that overlays the top of the border rim 50 of the plastic top 40. This paper ring washer 82 also has certain desirable characteristics. It is preferably made of a piece of paper that is relatively hard and only slightly compressible to provide both electrical insulating qualities and some pressure-resistance. In assembly, this paper ring 82 overlying the crimped material 92 is placed and kept under pressure that will be now explained.

The application of the paper ring 82 on the crimped metal 92 of can 12, and the additional pressure on that paper ring 82 that will be applied, as will be explained below, tends to place external pressure on the crimped material 92 in such a way as to make it practically impossible for that crimped material to move further away from the engaged upper surface of the border rim 50 of the plastic disc 40. With that additional pressure on the crimped material, a completely effective seal is assured so that any of the electrolyte that might otherwise get into the area of the bead, because of casual or undesired external manual manipulations of the cell, would be unable to move upward and outward out of the cell structure, or proscribed regions in the cell.

The manner in which the extra pressure is applied to the paper annulus 82 may now be considered.

As shown in FIG. 2, the inner container can 12 is surrounded by a layer of insulating material such as a paper tube 94 and then an external steel jacket 96 is applied to surround the paper tube.

After the operation of positioning the anode collector 20 and plastic disc 40 in said can 12, the open rim of can 12 is crimped onto the border rim 50 of said plastic disc 40.

The paper ring 86 is then placed in position on said crimp of can 12, and the pre-formed negative end cap 80 is seated on said paper ring 86 and crimped at said position to apply pressure onto said paper ring 86, and, through said paper ring, onto the first crimp, of said can 12.

The outer negative end cap 80 is provided with a large circular plate 100 with a lower depending rim or apron 102, and a horizontal annular seating and pressure ring 104, and an encircling crimped eye 106, shown in detail in FIG. 3 (a).

Returning to the assembly in FIG. 2, said seating and pressure annular ring 104 of said outer negative end cap 80 seats on the paper ring annulus 86. The pressure impressed on that seating and pressure annulus 104 of negative cap 80 is applied through said crimped eye 106 and an encircling and crimping bend 110 at the upper end of said outer steel jacket 96. Said steel crimping bend 110 is insulated from said negative cap 80 by said paper tube 94 between said inner steel tube 10 and said steel jacket 96.

At the other end, said steel jacket 96 is similarly provided with a semi-circular bend 112 to press the circular crimp rim edge 114 of a contact terminal cup 116 into engagement with the bottom surface of said inner can 12 so that the contact terminal 116 may serve as a contact button for connection to an external electrical circuit. Said crimped eye 114 of that contact terminal 116 is similarly insulated from the outer steel jacket 96 by said paper tube 94.

It will now be seen that the steel jacket serves as a pressure producing device anchored at the bottom of the cell and extending to the top of the cell to create the pressure on the paper annular ring 86 that will press down on the crimped material of the inner can 12 and assure practically permanent and tight surface-to-surface relationship between the crimped section 92 of the inner can 12 and the upper surface of said annular border rim 50 of said plastic disc 40, thereby preventing electrolyte creepage, and thereby ensuring that the cell will remain both operative and clean on its outer surface throughout shelf life.

After the outer steel jacket 96 is crimped at both ends, the negative cap terminal 80 is spot-welded to the top surface of the rivet 36 by application of two terminals of an external welding circuit to an area of said cap terminal 80 directly above the rivet. As previously mentioned, the rivet is preferably made of an alloy that is compatible with the anode material and has good resistance welding characteristics, such as a commercial alloy of copper, zinc and nickel known as "Nickel Silver." Alloys of 8 to 18 percent nickel have been found to be satisfactory for such welding.

The surfaces on the shank of said rivet 44 and on said bore 42 of the plastic disc are also maintained under heavy pressure by reason of the press fit between them, and the pressure reaction of said border annular ring 50 of said plastic disc working back through said radial webs 54 on said plastic disc 40, as in FIG. 5.

A further feature remains to be discussed. In FIG. 3, the depending apron 58 of said plastic disc is shown. In FIG. 2, said apron 58 is seen to be accommodated by a small annular cavity 120 in the cathode material, and extends downward to surround the top open ends of the bags that serve as the separator between the two parts of the cell. Those separator bags are now seen turned inward and crimped to closer position with respect to the top of said anode collector 20 so that very little space is left for the electrolyte to move into, out of those bags. The plastic disc 40 serves this additional function of essentially closing the separator bags to reduce the space through which any electrolyte might escape from its working region.

Thus the electrolyte can engage only said plastic disc 40 beyond its working region, and is effectively confined, so it cannot reach other regions and cause erosive effects.

The invention has been described in connection with one form of the invention to show a preferred operative form which has served the purpose of the invention and functions as intended. It is obvious that modifications might be made in the dimensions and in the relative design of the individual structural parts without departing from the spirit and scope of the invention, however, as described in the claims.

What is claimed is:

1. A primary battery cell, comprising a cylindrical metal cup, closed at its bottom end and originally fully open at its top end to receive cell elements, and having a top end rim edge border for subsequent crimping;

said cup having an internal peripheral bead on its inner wall, in position adjacent to and below said rim edge border of said cup at said top end, where said bead serves as a seat;

a unitarily formed plastic disc to serve as a closure for said cell and extending across the full transverse diameter within said cup and seating directly on said internal peripheral bead as a supporting seat;

said plastic disc having an enlarged annular border portion engaging the inner wall of said cup above said bead, with the top end rim border of said cup crimped over onto said enlarged annular border of said plastic disc, said plastic disc is also having a central axial bore;

cathode material adjacent the metal cup and anode material concentrically within said cup;

an elongated metal anode collector extending into said cell to engage said anode material in said cell;

an electrical anode conductor extending through said central axial bore in said plastic disc and supported thereby, and electrically connected to and physically supporting said metal anode collector from the under side of said plastic disc;

and an external electrode terminal for said cell electrically connected to said electrical anode conductor at a region above the top surface of said plastic disc.

2. A primary battery cell, as in claim 1, in which said circular plastic disc has a circular co-axial boss or hub encircling said central axial bore and said co-axial boss or hub has an axial length greater than the thickness of said plastic disc to provide a relatively long axial surface-to-surface contact between said electrical anode conductor and the wall surface of said hub around said central opening, to establish a long leakage path to any chemical from within the cell.

3. A primary battery cell, as in claim 2, in which said electrical anode conductor and said central bore are so relatively dimensioned in diameter along their length of engagement, that the plastic material in the wall surrounding said central bore is placed and kept under compression by said anode conductor when inserted, to serve to establish a tight seal.

4. A primary battery cell, as in claim 1, in which said enlarged annular border portion of said plastic disc has an annular raised vertical border edge portion to receive the crimped rim edge of the top end of said metal cup above said bead, and to thereby provide a tight surface-to-surface hermetic seal between the plastic disc and the crimped rim edge metal of said cup.

5. A primary battery cell, as in claim 4, in which
said vertical border edge portion of said disc is resilient and self-restoring toward original position from which it has been compressed;
and said metal crimped and formed onto said raised vertical border edge portion is slightly over-formed beyond the final desired crimping position but still within the elastic limit of said metal, so the small amount of spring-back of said crimped metal will be followed by the resilient border edge portion of said plastic disc, to maintain the surface-to-surface seal between said crimped metal and the resilient plastic disc material engaged thereby.

6. A primary battery cell, as in claim 1, in which
said electrical anode conductor is a metallic rivet having a central shank body, a hollow shank extension to provide an easily peenable portion, and a flat top head, said central shank body being slightly tapered to permit insertion of said shank body with a tight press-fit into said central bore of said plastic disc;
and said anode collector consists of a cylindrical shell having one end closed and with a hole therein to receive said hollow shank extension of said rivet shank body,
with said hollow shank extension of said rivet peened over the metal bordering said hole in said anode collector to tightly secure said anode collector body to said plastic disc as a support for said anode collector body,
and said flat top head of said rivet is welded to said external electrode terminal above the top of said plastic disc.

7. A primary battery cell, as in claim 6, in which
said rivet consists of a "Nickel Silver" alloy, to be compatible with the anode material in said cell, and to have good resistance welding characteristics, said alloy having a nickel content in the range from 8 to 18 percent.

8. A primary battery cell, as in claim 1, including
means for holding the crimped top edge of said cup in tight surface-to-surface engagement with said top annular border portion of said plastic disc, to maintain a substantially hermetic seal pressure between said engaging surfaces to deter chemical creepage along and between those surfaces.

9. A primary battery cell, as in claim 1, in which
said plastic disc has a peripheral annular shoulder stepped radially inward to seat on said peripheral bead on said cup,
and said plastic disc embodies a shank that extends axially downwardly beyond said radially stepped shoulder and fits snugly within said circular bead on the inside of said metal cup, while the body portion of said plastic disc above the stepped shoulder fits snugly in said metal cup above said bead.

10. A primary battery cell, as in claim 9, in which
said portion of said plastic disc above said stepped shoulder is formed to constitute means for serving as a bracing portion between the upper uncrimped portion of the metal cup above said bead and the hub portion of said plastic disc which surrounds the central bore.

11. A primary battery cell, as in claim 8, in which
said holding means for holding the crimped metal and the cell top closure in pressed relation are in part supported by said terminal cap.

12. A primary battery cell, as in claim 1, comprising, further an external jacket for the cell;
and means insulating the jacket in operating position from the first-mentioned cylindrical metal cup.

13. A primary cell, as in claim 12, in which
means including said external jacket is formed and disposed to impress an additional pressure force on said crimped cup metal against said annular border portion of said plastic disc.

14. A primary battery cell, as in claim 13, in which
said external jacket surrounds the cell as a body;
means are disposed for insulating said jacket from said first-mentioned cylindrical metal cup;
and means constituting a crimped end of said external jacket are disposed for pressing against said crimped cylindrical metal cup to generate said additional holding pressure force added onto said crimped cup edge on said plastic disc.

15. A primary battery cell, as in claim 14, in which
there is embodied a crimped rim at the upper end of said external jacket;
a negative cap terminal in place at said upper end of the cell for electrical connection to an external circuit;
and said crimped rim at said end of said jacket serves to hold said negative cap terminal in place and to generate said added holding pressure on the crimp of said cup against said plastic disc.

16. In a battery cell, as in claim 1,
a cup, to serve as a container, closed at the bottom and open at the top to receive the chemical elements for the cell with said plastic disc to fit snugly within the open end of the cup, and the open rim edge of the cup crimped over the top border area of said plastic disc;
an outer jacket surrounding and insulated from said cell cup;
and means on said jacket to impress a compression force on the crimped edge material of the cup to add to the self-pressure of the crimped material against the plastic disc.

17. A primary battery cell, as in claim 1, comprising, further,
an external jacket for the cell;
means insulating the jacket in operating position from the first-mentioned cylindrical metal cup;
and means controlled by said jacket for further pressing the crimped border rim in position on the plastic cell top closure.

18. A primary battery cell, as in claim 1, in which
said metal anode collector has two semi-cylindrical portions, each with a transverse tab and with the facing edges of said tabs touching in non-co-planar relation to act as stops against each other to hold their two semi-cylindrical portions from being radially compressed out of desired and intended cylindrical disposition after assembly in the cell.

\* \* \* \* \*